US012681233B2

(12) United States Patent
Pohlen et al.

(10) Patent No.: US 12,681,233 B2
(45) Date of Patent: Jul. 14, 2026

(54) PANE ARRANGEMENT FOR A VEHICLE ROOF, AND VEHICLE ROOF FOR A VEHICLE

(71) Applicant: Webasto SE, Stockdorf (DE)

(72) Inventors: Markus Walter Pohlen, Stockdorf (DE); Olivier Farreyrol, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 19/081,377

(22) Filed: Mar. 17, 2025

(65) Prior Publication Data

US 2025/0298181 A1 Sep. 25, 2025

(30) Foreign Application Priority Data

Mar. 22, 2024 (DE) ...................... 10 2024 108 287.9

(51) Int. Cl.
*F21V 8/00* (2006.01)
*B32B 7/12* (2006.01)
(Continued)

(52) U.S. Cl.
CPC .............. *G02B 6/0088* (2013.01); *B32B 7/12* (2013.01); *B32B 17/10036* (2013.01);
(Continued)

(58) Field of Classification Search
CPC ............... B60Q 3/62; B32B 17/10036; B32B 17/10541; B62D 25/06
See application file for complete search history.

(56) References Cited

U.S. PATENT DOCUMENTS

2009/0046355 A1* 2/2009 Derda ............... B32B 17/10541
359/359
2015/0078020 A1* 3/2015 Verrat .................... B60Q 1/268
362/509
(Continued)

FOREIGN PATENT DOCUMENTS

DE 102019212537 A1 3/2020
DE 102019102025 A1 7/2020
(Continued)

OTHER PUBLICATIONS

Office Action issued in corresponding German Application No. 10 2024 108 287.9; mailed Oct. 1, 2024; In German with English machine translation (12 pages).

*Primary Examiner* — Christopher E Dunay
(74) *Attorney, Agent, or Firm* — Fitch, Even, Tabin & Flannery, LLP

(57) ABSTRACT

A pane arrangement for a vehicle roof may have a first pane element which has a first main face and a second main face which is opposite the first main face along a stacking direction, a second pane element which has a third main face and has a fourth main face which is opposite the third main face along the stacking direction, the second pane element being coupled to the first pane element, and the second pane element being embodied as a plate-like light guide element which is coupled to a light source and is configured to guide light fed in from the light source and to provide it for a prescribed lighting of the vehicle interior. The pane arrangement may further have a first plastic layer which is arranged in stacking direction between the first pane element and the second pane element, and a first absorption element which is arranged in stacking direction between the first plastic layer and the second pane element.

15 Claims, 2 Drawing Sheets

(51) Int. Cl.

| | | |
|---|---|---|
| *B32B 17/10* | (2006.01) | |
| *B60Q 3/62* | (2017.01) | |
| *B62D 25/06* | (2006.01) | |

(52) U.S. Cl.
CPC .. *B32B 17/10541* (2013.01); *B32B 17/10761* (2013.01); *B60Q 3/62* (2017.02); *B62D 25/06* (2013.01); *G02B 6/0076* (2013.01); *B32B 2307/41* (2013.01); *B32B 2307/418* (2013.01); *B32B 2605/00* (2013.01)

(56)             References Cited

U.S. PATENT DOCUMENTS

| | | | | |
|---|---|---|---|---|
| 2018/0297515 A1* | 10/2018 | Laluet | .................... | B60J 1/001 |
| 2022/0153353 A1* | 5/2022 | Zunzer | ................... | B62D 65/06 |
| 2025/0050624 A1* | 2/2025 | Do Rosario | ...... | B32B 17/10513 |
| 2025/0091326 A1* | 3/2025 | Do Rosario | ............. | B32B 3/08 |
| 2025/0102722 A1* | 3/2025 | Mooraj | ............... | G02B 6/0035 |

FOREIGN PATENT DOCUMENTS

| | | | | | |
|---|---|---|---|---|---|
| DE | 202022100518 | U1 | 2/2022 | | |
| DE | 202021004001 | U1 | 4/2022 | | |
| DE | 202021004291 | U1 | 7/2023 | | |
| DE | 102022130336 | A1 | 5/2024 | | |
| DE | 102022130344 | A1 | 5/2024 | | |
| DE | 102022130347 | A1 | 5/2024 | | |
| WO | 2022030543 | A1 | 2/2022 | | |
| WO | 2023144171 | A1 | 8/2023 | | |
| WO | 2023144282 | A1 | 8/2023 | | |
| WO | 2023152445 | A1 | 8/2023 | | |
| WO | 2023160997 | A1 | 8/2023 | | |
| WO | WO-2023144172 | A1 * | 8/2023 | ........... | G02B 6/0095 |

* cited by examiner

PANE ARRANGEMENT FOR A VEHICLE ROOF, AND VEHICLE ROOF FOR A VEHICLE

CROSS-REFERENCE TO RELATED APPLICATION

This application claims the benefit of German Application No. DE 10 2024 108 287.9 filed Mar. 22, 2024, which is incorporated herein by reference in its entirety.

TECHNICAL FIELD

The present invention relates to a pane arrangement which comprises a light guide element. The present invention further relates to a vehicle having such a pane arrangement.

BACKGROUND

Integrated in the roof of certain motor vehicles is a roof opening which is closed with a cover composed in particular of glass so as to realize a view out of the motor vehicle. The cover may have a openable embodiment in order to enable exchange of air, if desired, as well as the view. Furthermore, the interior of certain motor vehicles comprises lighting facilities at various points. Light guides are used accordingly in the region of roof systems, for example. In this context, the total reflection at the boundary layer between the light guide and surrounding layers or the air is used to keep the light in the light guide.

SUMMARY

It is desirable to create an arrangement for a vehicle that enhances the comfort in a vehicle interior. The arrangement may be mounted in a vehicle interior.

According to one embodiment, a pane arrangement for a vehicle roof comprises a first pane element which has a first main face and a second main face which is opposite the first main face along a stacking direction. The pane arrangement further comprises a second pane element which has a third main face and a fourth main face which is opposite the third main face along the stacking direction, the second pane element being coupled to the first pane element. The second pane element is additionally embodied as a plate-like light guide element which is coupled to a light source and is configured to guide light fed in from the light source and to provide it for a prescribed lighting of the vehicle interior. The pane arrangement comprises, moreover, a first plastic layer which is arranged in stacking direction between the first pane element and the second pane element, and a first absorption element which is arranged in stacking direction between the first plastic layer and the second pane element.

The first, second, third and fourth main faces each have a greater extent than side faces, oriented transversely thereto, of the first and second pane elements. The first pane element reaches with a sheetlike extent and has a significantly greater extent along the first and second main faces than transversely thereto. The second pane element reaches with a sheetlike extent and has a significantly greater extent along the third and fourth main faces than transversely thereto. The first and second pane elements are arranged in accordance with the stacking direction in such a way that the third main face and the second main face are oriented facing one another.

The stacking direction is defined such that, starting from a side of the pane arrangement outside the vehicle, it points to a side of the pane arrangement inside the vehicle. The stacking direction reaches, for example, along the direction which points from the first main face to the fourth main face. The region on that side of the pane arrangement which is located inside the vehicle is also referred to as the vehicle interior. The region on that side of the pane arrangement which is located outside the vehicle is also referred to as the exterior.

The first pane element may, as an outer pane, form the outermost element which, when installed for example in a vehicle roof of a vehicle, borders the exterior. Alternatively, one or more elements may cover the first pane element from above, so that the latter does not realize the outermost element, instead facing the exterior in comparison to the second pane element. Correspondingly, the second pane element may, as an inner pane, form the innermost element which, when installed in a vehicle roof of a vehicle, is one of the elements delimiting the vehicle interior. Alternatively, one or more elements may cover the second pane element from below, so that the latter does not realize the innermost element, instead facing the vehicle interior in comparison to the first pane element.

The plastic layer between the two pane elements serves, for example, as a hotmelt adhesive layer, for joining the first pane element and the second pane element to one another.

The light guide element utilizes the effect of total reflection in order to guide light and to ensure lighting of the vehicle interior. The light is provided by the light source. The light source is, for example, a light-emitting diode. The total reflection is a physical effect which occurs with waves, such as light waves, for example. The total reflection occurs when the light is incident at a shallow angle on a boundary layer to another light-transmissive medium having a lower refractive index. The angle of incidence is defined as the angle between the light ray incident on the boundary layer and the line standing perpendicularly on the boundary layer. Below the limiting angle, the light ray impinging on the boundary layer is refracted away from the perpendicular and crosses into the bordering medium. Above the limiting angle, total reflection occurs. The light no longer crosses very largely into the other medium but is instead reflected substantially entirely into the exit medium. The angle at which the transition between total reflection and transmission into the bordering medium occurs is referred to as the limiting angle of the total reflection. Accordingly, light rays running at a shallow angle to the pane face are guided by repeated total reflections in the light guide element until they are coupled out by means of light scattering by outcoupling elements, for example. In this context, light rays running at a shallow angle to the pane face are light rays which run at an angle to the boundary layer of between 0° and the limiting angle. The outcoupling elements either change the incident angle in such a way that they are enabled to couple out the light, because the angle is less than the limiting angle and the conditions for total reflection are no longer met. Or the outcoupling elements change the refractive index of the bordering medium in such a way that the limiting angle at which total reflection still occurs is shifted such that at a given incident angle of the light rays, total reflection no longer occurs. Here, the outcoupling element itself may be part of the bordering medium. The light guide element consists for example of glass, polymethyl methacrylate and/or polycarbonate or comprises such a material. To prevent color change during passage through the light guide element, preference is given to using a material featuring color-neutral absorption, e.g., glass having a low iron oxide content (known as low-iron glass).

The at least one light source used illuminates the second pane element and is coupled to the second pane element via at least one incoupling element, a prism for example. The prism is mounted at the fourth main face, for example, and couples the light from the light source into the light guide element, which is formed by the second pane element. The region in which the light source and the prism are arranged is, for example, an edge region of the pane arrangement. The edge region reaches, for example, along a vehicle longitudinal direction and may be arranged on the sides along the lateral direction. A vehicle longitudinal direction reaches from the rear window to the windshield, as is customary in a vehicle ready for operation. Accordingly, the incoupling elements may be arranged in the edge region in the vicinity of the rear window, the windshield, or at the sides along the vehicle longitudinal direction.

The light of the light source is shadowed using the first absorption element, which is embodied for example as an opaque layer. The first absorption element is arranged between the two pane elements. The first absorption element is arranged more particularly between the first plastic layer and the second pane element. The first absorption element is arranged in the region of the light source and the prism. The first absorption element is, for example, a black self-adhesive film which is adhered on the third main face in the region of the light source and the prism. Accordingly, the first absorption element may be arranged in the edge region in the vicinity of the rear window, the windshield, or at the sides along the vehicle longitudinal direction.

The first absorption element prevents the light source being visible from outside the vehicle. Moreover, the first absorption element has the advantage that it at least reduces the light rays which might unintentionally be coupled out from the second pane element. With the first absorption element, therefore, it is possible to prevent the light rays being unintentionally coupled out during further transit along the second pane element. This reduces or prevents unwanted illumination, for example, of the layers lying above the second pane element. In this context, a layer lying above the second pane element is a layer which lies along the stacking direction between the first pane element and the second pane element. In this way, the first absorption element also prevents light rays being coupled out unintentionally into layers which lie below the second pane element, thereby preventing unwanted illumination of the vehicle interior.

According to a further embodiment, the pane arrangement comprises a second plastic layer, which is arranged in stacking direction between the first plastic layer and the second pane element, and a switchable interlayer, which is arranged in stacking direction between the first plastic layer and the second plastic layer, the first absorption element being arranged in stacking direction between the second plastic layer and the second pane element.

The switchable interlayer may be implemented as a passively or actively switchable interlayer. The actively switchable interlayers include, for example, electrochromic glass (EC), liquid-crystal glass (LC), polymer-dispersed liquid-crystal glass (PDLC), and glasses featuring a suspended particle device composition (SPD). Thermochromic and photochromic glasses are representatives, for example, of the passively switchable interlayers. The pane arrangement is not confined to glass panes and encompasses, for example, plastic panes. The switchable interlayer is, for example, an actively switchable film which is formed of a suspended particle device composition (SPD) and/or an electrochromic layer (EC) and/or a liquid-crystal (LC) and/or polymer-dispersed liquid crystals (PDLC) or comprises such a material.

The plastic layers between the two pane elements serve as a hotmelt adhesive layer for joining the first pane element and the second pane element to one another. A switchable interlayer makes it possible to adjust the light transmissibility through the interlayer and hence a light transmissibility through the entire pane arrangement.

Additional layers may be provided at the main faces, in order, for example, to improve the darkening or to realize other functions, such as temperature regulation in the vehicle interior or an improvement in the visual appearance, for example.

According to at least one embodiment, the first plastic layer and/or the second plastic layer is embodied as a layer of polyvinyl butyral or comprises such a material.

The switchable interlayer is, for example, embedded in the plastic layer, which, for example, is fabricated from polyvinyl butyral (PVB) and/or ethylene-vinyl acetate (EVA) and/or thermoplastic polyolefin (TPO) and/or polyolefin (PO) and/or thermoplastic polyurethane (TPU) or comprises such a material.

Alternatively or additionally, a frame is arranged around the switchable interlayer. The frame is situated along the stacking direction between the first pane element and the second pane element. The dimensions of the switchable interlayer are smaller than the dimensions of the two pane elements. Accordingly, the switchable interlayer does not extend as far as the edge region of the two pane elements. To avoid or compensate a difference in height along the pane arrangement in the edge region of the pane elements, a frame is used. This frame may comprise the same material as the two plastic layers. The frame, for example, is formed of polyvinyl butyral (PVB) and/or ethylene-vinyl acetate (EVA) and/or thermoplastic polyolefin (TPO) and/or polyolefin (PO) and/or thermoplastic polyurethane (TPU) or comprises such a material. The optical properties of the frame are relatively unimportant, as the dark coloration of the first absorption element means that the frame is concealed in the edge region of the pane elements and is therefore not visible at least from the vehicle interior. As considered starting from the light source and counter to the stacking direction, moreover, the frame is shielded by the first absorption element.

According to one embodiment, the first absorption element comprises a carrier material and an adhesive layer.

The treated surface faces the first pane element and the adhesive layer faces the second pane element. The carrier material is arranged in stacking direction between the treated surface and the adhesive layer. The carrier material is, for example, a black strip or a black film. The first absorption element is, for example, a self-adhesive black film with a top side which is suitably treated for improved adhesion at the plastic layer.

According to a further embodiment, the first absorption element comprises a treated surface which is a corona-treated surface and/or a flame-treated surface and/or a surface treated with a primer and/or a surface treated with an adhesion promoter.

According to a further embodiment, the adhesive layer comprises a pressure-sensitive adhesive and/or an optically clear adhesive.

By virtue of the adhesive layer of the first absorption element having been provided with a pressure-sensitive adhesive (PSA) and/or with a transparent or optically clear adhesive (OCA), the carrier material can be mounted in a suitable way on the third main face. The adhesive layer makes it possible to guide light in the light guide element in the region of the first absorption element without light rays being absorbed because of the black coloration of the first absorption element.

According to a further embodiment, the refractive index of the adhesive layer is greater than or equal to the refractive index of the second plastic layer.

The refractive index of the adhesive layer is advantageously the same as the refractive index of the bordering second plastic layer. In this case, the conditions for total reflection within the second pane element in the region of the first absorption element are identical to the conditions in the region in which the second plastic layer bears directly against the second pane element. Light rays which undergo total reflection at the boundary layer between the second pane element and the second plastic layer behave identically in the region of the first absorption element. The boundary layer between the second pane element and the second plastic layer has the same transition as the boundary layer between the second pane element and the adhesive layer, since the refractive indices of the adhesive layer and the second plastic layer are the same. If the refractive index of the adhesive layer is greater than the refractive index of the second plastic layer, the limiting angle at the boundary layer between the second pane element and the adhesive layer is greater than the limiting angle at the boundary layer between the second pane element and the second plastic layer. Accordingly, the only light rays to undergo total reflection in the region of the first absorption element are those with an angle of incidence that also undergo total reflection in the region without the first absorption element. Hence there is no unintentional outcoupling of the light rays at the boundary layer between the second pane element and the second plastic layer. The refractive index of the adhesive layer corresponds, for example, to the refractive index of the second plastic layer which consists of polyvinyl butyral (PVB). Alternatively, the refractive index of the adhesive layer is greater than, for example, the refractive index of the second plastic layer which consists of polyvinyl butyral (PVB).

The first absorption element advantageously makes it possible for the angle of the light from the light source that is reflected at the first absorption element and/or at the adhesive layer and that in turn is reflected at the fourth main face in the direction of the switchable interlayer to be influenced in such a way that total reflection can occur within the second pane element. The light reflected by the fourth main face is reflected in the direction of the third main face and remains in the second pane element. Unintentional outcoupling of the light is prevented in this way. This prevents the switchable interlayer, which is realized, for example, as a PDLC and scatters light diffusely, from being lit.

According to a further embodiment, the first absorption element reaches along a lateral direction and has a first overlap region with the switchable interlayer along the lateral direction.

The lateral direction is perpendicular to the stacking direction and reaches along the main faces of the two pane elements. The overlap region improves the overall aesthetics of the pane arrangement, with the first absorption element masking the transition of the frame to the switchable interlayer.

According to a further embodiment, a black print reaches along the lateral direction at the second main face and has a second overlap region with the switchable interlayer along the lateral direction, the second overlap region being greater than the first overlap region along the lateral direction.

The light from the light source is shadowed using the black print located on the second main face. The black print and the first absorption element, which is embodied, for example, as an opaque layer, together realize an improved possibility for the shading of the light if the vehicle interior is viewed from outside the vehicle. The black print at the second main face also makes it possible for components of the vehicle to be concealed more effectively in the roof region and hence enables an improved aesthetic impression.

The black print on the second main face has a greater extent in the lateral direction. Viewed along the stacking direction, the black print covers the underlying first absorption element. This is more aesthetically appealing when the vehicle interior is viewed from outside the vehicle.

According to a further embodiment, the pane arrangement comprises a second absorption element which is arranged at the fourth main face.

The second absorption element is arranged at the fourth main face in the region of the first absorption element, close to the edge to the switchable interlayer. The second absorption element is, for example, a black structure which is able to absorb the light reflected from there toward the switchable interlayer.

The second absorption element strengthens the effect of absorbing and/or suitably reflecting light rays reflected at an angle which lies below the limiting angle for total reflection, and so the angles of incidence of the light rays continue to meet the conditions for total reflection.

According to a further embodiment, the second absorption element comprises a black print and/or an absorbent adhesive and/or a primer.

The second absorption element is formed for example as a black enamel or black print. Alternatively or additionally, the second absorption element is an adhered film. Alternatively or additionally, the second absorption element comprises an adhesive layer, a carrier material and/or a treated surface. The adhesive layer faces the fourth main face and is arranged between the carrier material of the second absorption element and the second pane element. The adhesive layer comprises, for example, a pressure-sensitive adhesive (PSA) and/or an optically clear adhesive (OCA). The refractive index of the adhesive layer of the second absorption element is, for example, less than equal to the refractive index of the second plastic layer. The refractive index of the adhesive layer of the second absorption element is, for example, less than or equal to the refractive index of polyvinyl butyral. In this way, light rays whose angle of incidence is smaller than the limiting angle are absorbed by the second absorption element. Consequently, there are fewer light rays reflected into the overlying second plastic layer that have an angle of incidence which does not undergo total reflection at the boundary layer between the second pane element and the second plastic layer.

Alternatively or additionally, the second absorption element may be embodied as a primer.

According to one embodiment, the second absorption element is structured in the form of dots and/or lines, whereby less light is absorbed.

The structuring of the second absorption element prevents excessive light being absorbed and reduces the darkening of the desired light guidance. Moreover, possible shadows which may arise in the switchable interlayer are reduced. The structuring comprises, for example, structures in the form of dots, lines or similar structures, whereby less light is absorbed.

According to one embodiment, the pane arrangement comprises a coating which reflects infrared rays and which is arranged at the second main face.

The light radiation, accordingly, is able to pass through the first pane element and the underlying layers and elements, but the heat radiation is reflected at the exterior. The reflected heat therefore reduces the entry of heat in the vehicle interior. Consequently, the vehicle interior is enabled to have a lightness which corresponds to daylight, while the vehicle interior is less greatly heated by the heat radiation of sunlight. The coating which reflects infrared rays is formed, for example, of silver or comprises such a material.

The first pane element is, for example, a translucent glass pane, to allow the coating which reflects infrared rays to be utilized on the second main face, and to reflect the infrared radiation. Alternatively or additionally, the second pane element is also a translucent glass pane, to obtain bending characteristics similar to those of the first pane element during production in an oven. The pane elements may alternatively or additionally be tinted. Alternatively or additionally, polycarbonate and/or polymethyl methacrylate (PMMA) panes are used.

According to one embodiment, the pane arrangement comprises a wavelength-selective, low-emissivity coating which is arranged at the fourth main face.

The wavelength-selective, low-emissivity coating (low E), also called a low-e layer, may be embodied for example as a metal oxide layer. The low-e layer reduces the total energy entering the vehicle interior by reducing the emission of energy which is absorbed by the dark PVB and/or glass. Indium tin oxide (ITO), for example, is used as a material for the low-e layer. This material reflects infrared radiation, especially infrared radiation in a wavelength range above 1400 nm. To increase the transmission and durability of the low-e layer, the silver coating, for example, is embedded in oxide layers. By virtue of the low-e layer, with cold outdoor temperatures in winter, for example, the loss of heat through heat radiation is reduced, hence saving on energy in the operation of the vehicle. At higher outdoor temperatures, such as in the summer, for example, the low-e layer, by virtue of its low level of emission of absorbed energy, reduces the total solar energy (total transmitted solar energy, TTS) transmitted into the vehicle interior.

According to a further aspect, a vehicle roof comprises a configuration of the above-described pane arrangement and a cover which is coupled to the pane arrangement and is embodied to close an opening in the vehicle roof. The cover may be embodied, for example, as a glass cover, with the pane arrangement forming a part or portion of the cover. Alternatively, the pane arrangement may also realize the cover entirely.

The cover may be fixed in the opening in the vehicle roof or may have a movable embodiment relative to the vehicle roof, to open up the roof opening as and when required.

BRIEF DESCRIPTION OF DRAWINGS

Exemplary embodiments of the disclosure are elucidated in more detail below with reference to the schematic drawings.

In the drawings.

Elements of identical construction and function are labeled across the figures with the same reference signs.

DETAILED DESCRIPTION

In this description, terms such as "top", "bottom", "top side", "bottom side", "inner" and "outer", "front" and "rear" refer to orientations and alignments of the kind illustrated in the figures and customary for a motor vehicle ready for operation.

Figure 1:
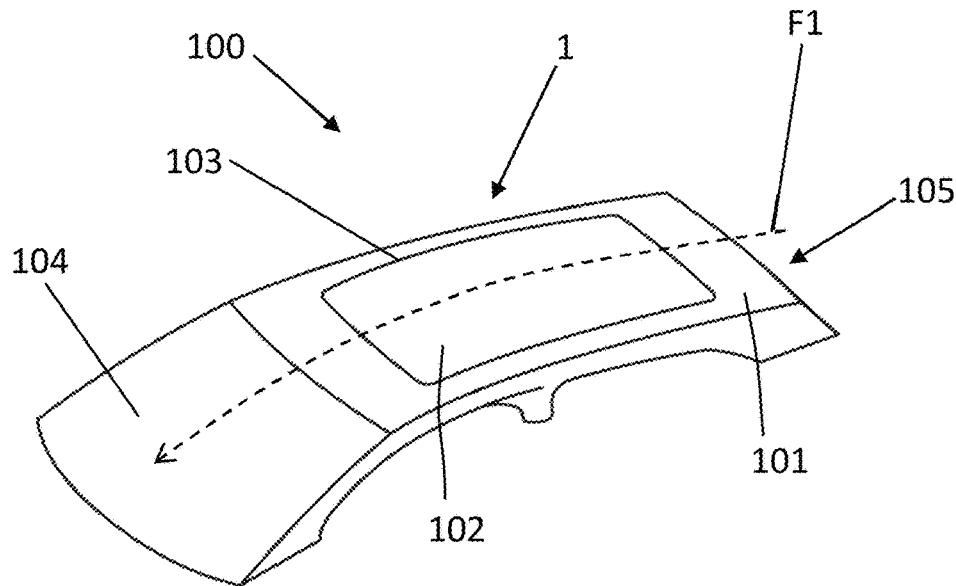
FIG. 1 shows a schematic representation of a part of a vehicle according to one exemplary embodiment, and FIGS. 2 to 4 each show schematic representations of a pane arrangement according to exemplary embodiments.

FIG. 1 shows a pane arrangement 1 for a vehicle roof 101 of a vehicle 100, which for example realizes a cover 102 in the vehicle roof 101 that is embodied to close a vehicle opening 103 in the vehicle roof 101. The pane arrangement 1 may form a part or portion of the cover 102 or alternatively may realize it entirely. The vehicle 100 additionally comprises a rear window 104 and a windshield 105. A vehicle longitudinal direction F1 reaches from the rear window 104 to the windshield 105.

Figure 2:
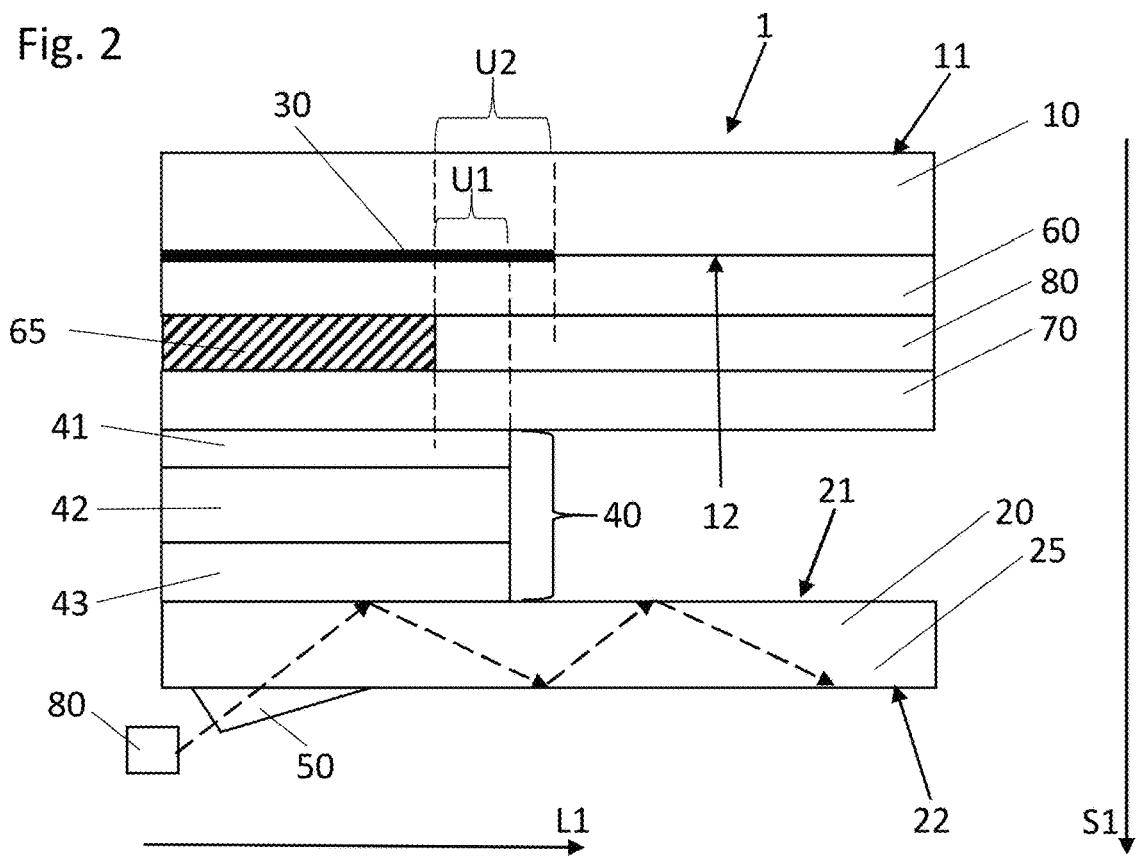

FIG. 2 shows an exemplary embodiment of the pane arrangement 1 in a schematic side view. The pane arrangement 1, along a stacking direction S1, first has a first pane element 10. In the operationally ready state, the first pane element 10 is arranged facing outward and away from an interior of the vehicle 100. The first pane element 10 has a first main face 11 and an oppositely arranged second main face 12. In the operationally ready state, the first main face 11 faces outward. In the operationally ready state, the second main face 12 faces the interior of the vehicle 100. Along the stacking direction S1, the second main face 12 is arranged opposite to the first main face 11. The pane arrangement 1 has a second pane element 20. The second pane element 20 has a third main face 21 and a fourth main face 22. The third main face 21 faces the first pane element 10. Along the stacking direction S1, the fourth main face 22 is arranged opposite to the third main face 21. The first pane element 10 and the second pane element 20 are arranged in accordance with the stacking direction S1 in such a way that the third main face 21 and the second main face 12 are aligned to one another.

The four main faces 11, 12, 21 and 22 are arranged in alignment with and at a distance from one another. More particularly, within the bounds of customary tolerances, the four main faces 11, 12, 21 and 22 are arranged parallel to one another. The two pane elements 10 and 20 reach, for example, substantially along a lateral direction L1. However, the pane elements 10 and 20 may also exhibit a curvature along the lateral direction L1.

The first pane element 10 and the second pane element 20 are, for example, translucent glass panes. Alternatively or additionally, the pane elements 10 and 20 may be tinted. Alternatively or additionally, polycarbonate and/or polymethyl methacrylate (PMMA) panes are used.

Arranged along the stacking direction S1 is first the first pane element 10, then a first plastic layer 60, then a switchable interlayer 80, and then in turn a second plastic layer 70. Arranged then in turn along the stacking direction S1 is the second pane element 20. The first pane element 10 and the second pane element 20 are coupled to one another by means of the plastic layer 60, 70. The first plastic layer 60 and/or the second plastic layer 70 are embodied, for example, as layers of polyvinyl butyral (PVB) or comprise such a material. The two plastic layers 60, 70 serve as a hotmelt adhesive layer to connect the first pane element 10 and the second pane element 20 to one another. Arranged around the switchable interlayer 80 is, for example, a frame 65. The frame 65 is located along the stacking direction S1 between the first pane element 10 and the second pane element 20. The dimensions of the switchable interlayer 80 are smaller than the dimensions of the two pane elements 10, 20. Accordingly, the switchable interlayer 80 does not extend to the edge of the two pane elements 10, 20. To avoid a difference in height along the pane arrangement 1 at the edge of the pane elements 10, 20, there is the frame 65. This frame 65 may comprise the same material as the two plastic layers 60, 70. The frame 65 is made for example of polyvinyl butyral (PVB) and/or ethylene-vinyl acetate (EVA) and/or thermoplastic polyolefin (TPO) and/or polyolefin (PO) and/or thermoplastic polyurethane (TPU) or comprises such a material. The optical properties of the frame 65 are relatively unimportant, as the frame 65 is concealed by the dark coloration of a black print 30 and of a first absorption element 40 in the edge region of the two pane elements 10, 20 and is therefore not visible from the vehicle interior and from outside the vehicle 100. In FIG. 2, the plastic layers 60, 70, composed for example of gray polyvinyl butyral, are used and are arranged over and under the switchable interlayer 80, which for example comprises a PDLC layer. The PDLC layer is black or white, for example, though is not confined to these two colors. In this way, the appearance achieved for the overall pane arrangement 1 both from the vehicle interior and from outside the vehicle 100 is the same, comprising for example a dark gray appearance, thereby improving the visual aspect.

Embedded between the two plastic layers 60, 70 is the switchable interlayer 80. The switchable interlayer 80 is formed, for example, of a suspended particle device (SPD) composition and/or a liquid crystal (LC) and/or polymer-dispersed liquid crystals (PDLC) or comprises such a material. The switchable interlayer 80 therefore constitutes a shading device which affords the opportunity to darken the vehicle interior in a comfortable way and/or to alter the transmission of light through the pane arrangement 1 by means, for example, of higher light scattering.

The second pane element 20 is used in the form of a plate-like light guide element 25. The light guide element 25 used is, for example, a translucent glass pane, such as white glass or clear glass. Alternatively or additionally, a translucent plastic pane may be used. The light guide element 25 is coupled to a light source 80 via an incoupling element 50. The incoupling element 50 is, for example, a prism and bears directly against the fourth main face 22 and/or is arranged with an adhesive at the fourth main face 22. The incoupling element 50 is arranged, for example, in an edge region of the second pane element 22. The light guide element 25 is able to conduct light fed in from the light source 80. Instead of an adhesive, a different coupling element, an optical oil for example, is also possible. An alternative possibility to the prism at the fourth main face 22 is an incoupling of light from the side which connects the third and fourth main faces 21 and 22 to one another. An alternative possibility, by way of a cutout in the light guide element 25, is to use an LED in order to realize a light source 80 which couples the light into the light guide element 25. A further alternative for an incoupling element 50 is realized by a vertical incoupling of light at the fourth main face 22 and corresponding diverting and scattering elements at the third main face 21. In FIG. 2, illustratively, the light is represented by individual light rays, which are shown as a dashed line. A prescribed lighting of the vehicle interior is provided accordingly.

The first absorption element 40 is likewise arranged in an edge region of the pane arrangement 1. The first absorption element 40 is arranged in stacking direction S1 between the second plastic layer 70 and the second pane element 20. The first absorption element 40 is arranged in the region of the light source 80 and the prism 50. The first absorption element 40 is, for example, a black, self-adhesive film which is adhered on the third main face 21 in the region of the light source 80 and the prism 50.

Visibility of the light source 80 from outside the vehicle is prevented by means of the first absorption element 40. Moreover, an advantage of the first absorption element 40 is that it at least reduces the light rays which might unintentionally be coupled out of the second pane element 20. With the first absorption element 40, therefore, it is possible to prevent the light rays from being unintentionally coupled out during further passage along the second pane element 20. This reduces or prevents unwanted lighting-up, for example, of the layers lying above the second pane element 20. The layers lying above the second pane element 20 are, for example, the second plastic layer 70, the switchable interlayer 80, the first plastic layer 60 and/or the first pane element 10. Furthermore, there may be other layers present, which are not represented here.

In this way, moreover, the first absorption element 40 prevents light rays from being unintentionally coupled out into layers which lie below the second pane element 20, thereby preventing unwanted lighting-up of the vehicle interior.

The first absorption element 40 comprises a treated surface 41, a carrier material 42, and an adhesive layer 43. The treated surface 42 faces the first pane element 10, and the adhesive layer 43 faces the second pane element 20. The carrier material 42 is arranged in stacking direction S1 between the treated surface 41 and the adhesive layer 43. The carrier material 42 is, for example, a black strip or a black film. The first absorption element 40 is, for example, a self-adhesive black film with a top side suitably treated for improved adhesion at the first or second plastic layer 60, 70. The treated surface 41 is, for example, a corona-treated surface and/or a flame-treated surface and/or a primer-treated surface. The treatment may be realized, for example, by plasma coating of amino-silane-based adhesion promoters (e.g., 3-[2-(2-aminoethylamino)ethylamino]propyl-trimethoxysilane) or other adhesion promoters. The adhesive layer 43 comprises a pressure-sensitive adhesive (PSA) and/or an optically clear adhesive (OCA). By means of the adhesive layer of the first absorption element 40, provided with a pressure-sensitive adhesive and/or an optically clear or transparent adhesive, the carrier material 42 can be mounted in a suitable way on the third main face 21. The adhesive layer 43 makes it possible to conduct light in the light guide element 25 in the region of the first absorption element 40 without light rays being absorbed by the first absorption element 40 owing to the black coloration. The refractive index of the adhesive layer 43 is greater than or equal to the refractive index of the second plastic layer 70. The refractive index of the adhesive layer 43 is greater than or equal to the refractive index of the first plastic layer 60 in the event that only one plastic layer is present. Generally speaking, the adhesive layer 43 has a refractive index greater than or equal to the refractive index of the bordering plastic layer. The refractive index of the adhesive layer 43 is advantageously the same as the refractive index of the bordering second plastic layer 70. In this case, the conditions for total reflection within the second pane element 20 in the region of the first absorption element 40 are the same as the conditions in the region in which the second plastic layer 70 bears directly against the second pane element 20. Light rays which undergo total reflection at the boundary layer between the second pane element 20 and the second plastic layer 70 behave approximately the same in the region of the first absorption element 40. The boundary layer between the second pane element 20 and the second plastic layer 70 has the same transition as the boundary layer between the second pane element 20 and the adhesive layer 43, since the refractive indices of the adhesive layer 43 and the second plastic layer 70 are the same. If the refractive index of the adhesive layer 43 is greater than the refractive index of the second plastic layer 70, the limiting angle at the boundary layer between the second pane element 20 and the adhesive layer 43 is greater than the limiting angle at the boundary layer between the second pane element 20 and the second plastic layer 70. Accordingly, the only light rays with an angle of incidence that undergo total reflection in the region of the first absorption element 40 are those which also undergo total reflection in the region without the first absorption element 40. Hence there is no unintentional outcoupling of the light rays at the boundary layer between the second pane element 20 and the second plastic layer 70. The refractive index of the adhesive layer 43 corresponds, for example, to the refractive index of the second plastic layer 70, which may consist of polyvinyl butyral (PVB). Alternatively, the refractive index of the adhesive layer 43 is greater than, for example, the refractive index of the second plastic layer 70, which may consist of polyvinyl butyral (PVB). The first absorption element 40 reaches along the lateral direction L1 and with the switchable interlayer 80 has a first overlap region U1 along the lateral direction L1. The lateral direction L1 is perpendicular to the stacking direction S1 and reaches substantially along the main faces 11, 12, 21, 22 of the two pane elements 10, 20. The first overlap region U1 enhances the overall aesthetic impression conveyed by the pane arrangement 1, with the first absorption element 40 masking the transition of the frame 65 to the switchable interlayer 80.

The black print 30 likewise reaches along the lateral direction L1 and is arranged at the second main face 12. The black print 30 with the switchable interlayer 80 has a second overlap region U2 along the lateral direction L1, with the second overlap region U2 being greater than the first overlap region U1 along the lateral direction L1.

The black print 30 and the first absorption element 40, which is embodied for example as an opaque layer, together realize an improved possibility for shading the light if the vehicle interior is viewed from outside the vehicle 100. The black print 30 at the second main face 12 also makes it possible for components of the vehicle 100 in the edge region of the roof to be disguised more effectively, and so creates a better aesthetic impression. Viewed along the stacking direction S1, the black print 30 conceals the underlying first absorption element 40.

Figure 3:
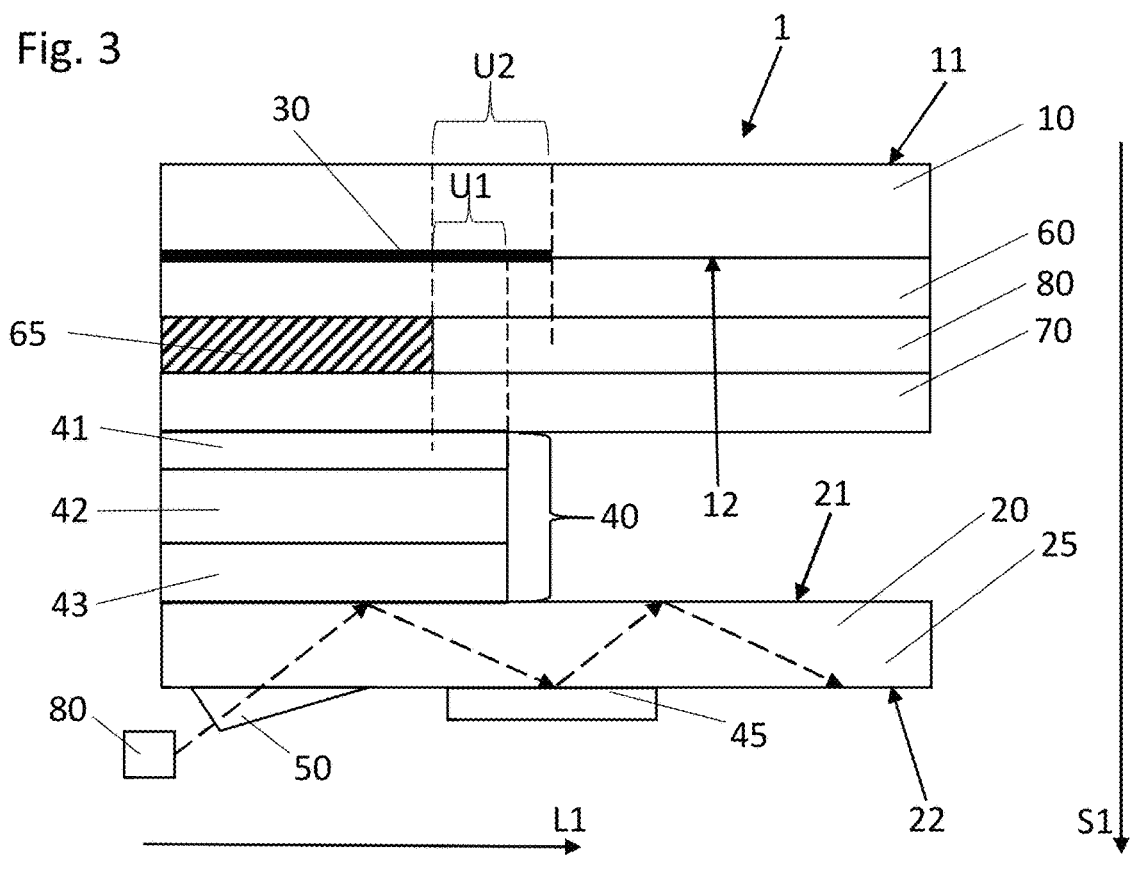

FIG. 3 shows a further exemplary embodiment of the pane arrangement 1 in a schematic sectional view. The pane arrangement 1 is the same as in FIG. 2, with the difference that the pane arrangement 1 comprises a second absorption element 45 which is arranged at the fourth main face 22. The second absorption element 45 is arranged in the region of the first absorption element 40, close to the edge to the switchable interlayer 80, and reaches along the lateral direction L1. The second absorption element 45 is, for example, a black structure which is able to absorb the light reflected from there toward the switchable interlayer 80. The second absorption element 45 strengthens the effect of absorbing and/or suitably reflecting light rays which are reflected at an angle lying below the limiting angle for total reflection, and so the angles of incidence of the light rays continue to meet the conditions for total reflection. The second absorption element 45 is formed, for example, as a black enamel or black print. The second absorption element 45 is embodied similarly to the black print 30. Alternatively or additionally, the second absorption element 45 is an adhered film. Alternatively or additionally, the second absorption element 45 comprises an adhesive layer, a carrier material and/or a treated surface. The adhesive layer faces the fourth main face 22 and is arranged between the carrier material of the second absorption element 45 and the second pane element 20. The adhesive layer comprises, for example, a pressure-sensitive adhesive (PSA) and/or an optically clear adhesive (OCA). The refractive index of the adhesive layer of the second absorption element 45 is, for example, less than or equal to the refractive index of the second plastic layer 70. The refractive index of the adhesive layer of the second absorption element 45 is, for example, less than or equal to the refractive index of polyvinyl butyral. In this way, light rays whose angle of incidence is less than the limiting angle are absorbed by the second absorption element 45. As a result, there are fewer light rays reflected into the overlying second plastic layer 70 that have an angle of incidence which does not undergo total reflection at the boundary layer between the second pane element 20 and the second plastic layer 70. Alternatively or additionally, the second absorption element 45 may be embodied as a primer.

The second absorption element 45 may be structured, whereby less light is absorbed. The structuring of the second absorption element 45 therefore prevents excessive light being absorbed and reduces the darkening of the desired light guidance. Moreover, possible shadows which may arise in the switchable interlayer 80 are reduced. The structuring comprises, for example, structures in the form of dots, lines or similar structures, whereby less light is absorbed.

Figure 4:
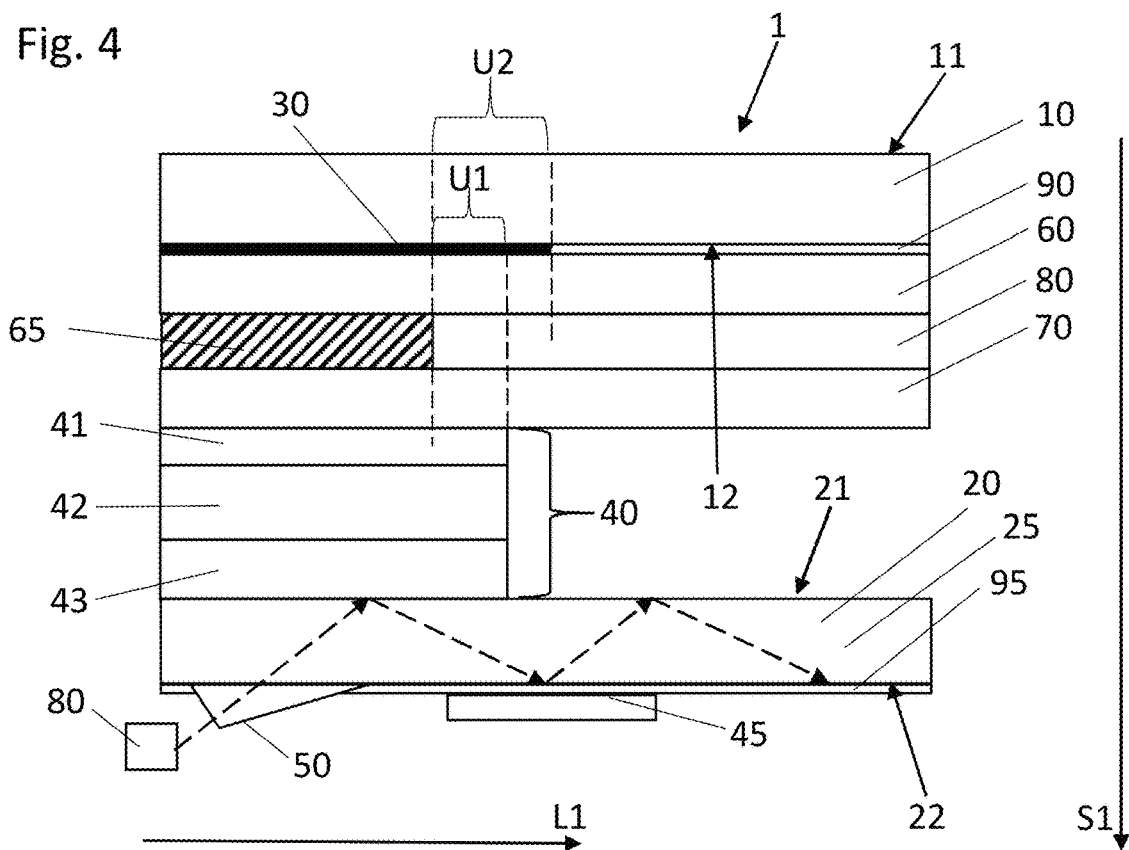

FIG. 4 shows a further exemplary embodiment of the pane arrangement 1 in a schematic sectional view. The pane arrangement 1 is the same as in FIG. 3, with the difference that the pane arrangement 1 comprises a coating 90 which reflects infrared rays and is arranged at the second main face 12. By virtue of the coating 90 which reflects infrared rays, the light radiation is able to pass through the first pane element 10 and the underlying layers and elements, but the heat radiation is reflected at the exterior. The reflected heat therefore reduces the heat input in the vehicle interior. As a result, a lightness corresponding to that of daylight is enabled in the vehicle interior, while the vehicle interior is less greatly heated by the heat radiation of sunlight. The coating 90 which reflects infrared rays is formed, for example, of silver or comprises such a material.

The pane arrangement 1 further comprises a wavelength-selective, low-emissivity coating 95 which is arranged at the fourth main face 22. The wavelength-selective, low-emissivity coating 95 (low-e), also called a low-e layer, may be embodied for example as a metal oxide layer. The low-e layer 95 reduces the total energy entering the vehicle interior by reducing the emission of energy which is absorbed by the pane arrangement 1, in particular by the plastic layers 60, 70 and/or by the pane elements 10, 20. Indium tin oxide (ITO), for example, is used as a material for the low-e layer 95. This material reflects infrared radiation, especially infrared radiation in a wavelength range above 1400 nm. To increase the transmission and durability of the low-e layer 95, the silver coating, for example, is embedded in oxide layers. By virtue of the low-e layer, with cold outdoor temperatures in the winter, for example, the loss of heat through heat radiation is reduced, hence saving on energy in the operation of the vehicle. At higher outdoor temperatures, such as in the summer, for example, the low-e layer 95, by virtue of its low level of emission of absorbed energy, reduces the total solar energy (total transmitted solar energy, TTS) transmitted into the vehicle interior. The regions at which the prism 50 is mounted on the second pane element 20 are free from the low-e layer 95. Alternatively or additionally, the regions at which the second absorption element 45 is mounted on the second pane element 20 are likewise free from the low-e layer 95.

Every combination of the coating 90 which reflects infrared rays, the low-e layer 95, the first absorption element 40 and the second absorption element 45 is possible. The pane arrangement 1 likewise comprises a combination of the coating 90 which reflects infrared rays, the low-e layer 95 and the first absorption element 40, without comprising the second absorption element 45.

In the interest of clarity, the proportions of the individual components do not correspond to the true proportions of the pane arrangement 1.

LIST OF REFERENCE SIGNS

1 pane arrangement
10 first pane element
11 first main face
12 second main face
20 second pane element
21 third main face
22 fourth main face
25 light guide element
26 light source
30 black print
40 first absorption element
41 treated surface
42 carrier material
43 adhesive layer
50 incoupling element
60 first plastic layer
70 second plastic layer
80 switchable interlayer
90 coating which reflects infrared rays
95 wavelength-selective, low-emissivity coating
100 vehicle
101 vehicle roof
102 cover
103 vehicle opening
104 windshield
105 rear window
S1 stacking direction
L1 lateral direction
F1 vehicle longitudinal direction

The invention claimed is:

1. Pane arrangement for a vehicle roof, comprising:
a first pane element which has a first main face and a second main face which is opposite the first main face along a stacking direction,
a second pane element which has a third main face and has a fourth main face which is opposite the third main face along the stacking direction, the second pane element being coupled to the first pane element, and
wherein the second pane element is embodied as a plate-like light guide element which is coupled to a light source and is configured to guide light fed in from the light source and to provide it for a prescribed lighting of the vehicle interior, a first plastic layer which is arranged in stacking direction between the first pane element and the second pane element, and a first absorption element which is arranged in an edge region of the pane arrangement and in a region adjacent to the light source in stacking direction between the first plastic layer and the second pane element, the first absorption element configured to prevent light rays from being unintentionally coupled out into layers which lie below and above the second pane element, thereby preventing unwanted lighting-up of the vehicle interior and preventing visibility of the light source from outside the vehicle respectively.

2. Pane arrangement according to claim 1, comprising: a second plastic layer which is arranged in stacking direction between the first plastic layer and the second pane element, and a switchable interlayer which is arranged in stacking direction between the first plastic layer and the second plastic layer, the first absorption element being arranged in stacking direction between the second plastic layer and the second pane element.

3. Pane arrangement according to claim 2, wherein the first plastic layer and/or the second plastic layer is embodied as a layer of polyvinyl butyral or comprises such a material.

4. Pane arrangement according to claim 2, wherein the first absorption element reaches along a lateral direction and has a first overlap region with the switchable interlayer along the lateral direction.

5. Pane arrangement according to claim 2, wherein a black print reaches along the lateral direction at the second main face and has a second overlap region with the switchable interlayer along the lateral direction, the second overlap region being greater than the first overlap region along the lateral direction.

6. Pane arrangement according to claim 1, wherein the first absorption element comprises: a carrier material and an adhesive layer.

7. Pane arrangement according to claim 6, wherein the adhesive layer comprises a pressure-sensitive adhesive and/or an optically clear adhesive.

8. Pane arrangement according to claim 6, wherein the refractive index of the adhesive layer is greater than or equal to the refractive index of the second plastic layer.

9. Pane arrangement according to claim 1, wherein the first absorption element comprises a treated surface which is a corona-treated surface and/or a flame-treated surface and/or a surface treated with a primer and/or a surface treated with an adhesion promoter.

10. Pane arrangement according to claim 1, comprising a second absorption element which is arranged at the fourth main face.

11. Pane arrangement according to claim 10, wherein the second absorption element comprises a black print and/or an absorbent adhesive and/or a primer.

12. Pane arrangement according to claim 10, wherein the second absorption element is structured in the form of dots and/or lines, whereby less light is absorbed.

13. Pane arrangement according to claim 1, comprising a coating which reflects infrared rays and is arranged at the second main face.

14. Pane arrangement according to claim 1, comprising a wavelength-selective, low-emissivity coating which is arranged at the fourth main face.

15. Vehicle roof for a vehicle, comprising: a pane arrangement according to claim 1, and a cover which is embodied to close a vehicle opening in the vehicle roof, the cover comprising the pane arrangement.

* * * * *